(12) United States Patent
Calvin

(10) Patent No.: US 11,041,756 B2
(45) Date of Patent: Jun. 22, 2021

(54) METHOD AND APPARATUS OF FILTERING LIGHT USING A SPECTROMETER ENHANCED WITH ADDITIONAL SPECTRAL FILTERS WITH OPTICAL ANALYSIS OF FLUORESCENCE AND SCATTERED LIGHT FROM PARTICLES SUSPENDED IN A LIQUID MEDIUM USING CONFOCAL AND NON CONFOCAL ILLUMINATION AND IMAGING

(71) Applicant: Charted Scientific, Inc., Austin, TX (US)

(72) Inventor: Edward Calvin, Austin, TX (US)

(73) Assignee: Charted Scientific Inc., Austin, TX (US)

( * ) Notice: Subject to any disclaimer, the term of this patent is extended or adjusted under 35 U.S.C. 154(b) by 0 days.

(21) Appl. No.: 16/545,788

(22) Filed: Aug. 20, 2019

(65) Prior Publication Data
US 2020/0033192 A1    Jan. 30, 2020

Related U.S. Application Data

(63) Continuation-in-part of application No. 16/049,727, filed on Jul. 30, 2018, now Pat. No. 10,585,028.
(Continued)

(51) Int. Cl.
*G01J 3/28* (2006.01)
*G01N 21/64* (2006.01)
(Continued)

(52) U.S. Cl.
CPC .......... *G01J 3/2803* (2013.01); *G01J 3/4406* (2013.01); *G01N 15/14* (2013.01); *G01N 21/64* (2013.01);
(Continued)

(58) Field of Classification Search
CPC ....... G01J 3/2803; G01J 3/4406; G01N 15/14
See application file for complete search history.

(56) References Cited

U.S. PATENT DOCUMENTS 5,037,207 A * 8/1991 Tomei ..................... G02B 6/08
356/444
5,192,980 A    3/1993 Dixon et al.
(Continued)

OTHER PUBLICATIONS

Haasen, Dorothea, et al. "Comparison of G-protein coupled receptor desensilization-related B-arrestin redistribution using confocal and non-confocal imaging." Combinatorial chemistry & high throughput screening 9.1 (2006): 37-47. https://booksc.xyz/book/43685891/18f78f.
(Continued)

*Primary Examiner* — Hugh Maupin
(74) *Attorney, Agent, or Firm* — David McEwing

(57) ABSTRACT

A system for filtering light using a spectrometer enhanced with spectral filters using an array of independent photodetectors to measure the fluorescent or scattered light signal. A system comprising a light source, an illuminated sample, a light spectrum device, a collimator lens, a plurality of spectral filters each having a varying and selected light transmission spectrum and a plurality of photodetectors wherein each photodetector is oriented to a spectral filter. A scanning cytometer for measuring fluorescence and light scattering from an illuminated portion of the sample comprising a first light source, a scanner scanning in two axes, a fluorescence detector, an objective lens, an optically translucent medium through which a sample may be illuminated and a confocal apparatus positioned distally from the light source and sample and through which light signals from the sample are transmitted to a fluorescence detector.

20 Claims, 11 Drawing Sheets

Related U.S. Application Data

(60) Provisional application No. 62/575,207, filed on Oct. 20, 2017, provisional application No. 62/726,772, filed on Sep. 4, 2018, provisional application No. 62/734,607, filed on Sep. 21, 2018, provisional application No. 62/883,715, filed on Aug. 7, 2019.

(51) Int. Cl.
*G01N 15/14* (2006.01)
*G01J 3/44* (2006.01)
*G01J 3/51* (2006.01)
*G01N 21/51* (2006.01)
*G01N 15/02* (2006.01)

(52) U.S. Cl.
CPC ............ *G01J 3/51* (2013.01); *G01N 15/0211* (2013.01); *G01N 21/51* (2013.01)

(56) References Cited

U.S. PATENT DOCUMENTS

| | | | |
|---|---|---|---|
| 5,248,876 A | 9/1993 | Kerstens et al. | |
| 5,381,224 A | 1/1995 | Dixon et al. | |
| 5,418,371 A | 5/1995 | Aslund | |
| 5,731,874 A | 3/1998 | Maluf | |
| 5,847,400 A | 12/1998 | Kain et al. | |
| 6,097,025 A | 8/2000 | Modlin et al. | |
| 6,177,277 B1 | 1/2001 | Soini | |
| 6,684,092 B2 | 1/2004 | Zavislan | |
| 6,804,000 B2 | 10/2004 | Roorda et al. | |
| 6,858,852 B2 | 2/2005 | Wolleschensky et al. | |
| 6,875,578 B2 | 4/2005 | Giulano et al. | |
| 6,891,613 B2 | 5/2005 | Wolleschensky | |
| 6,927,888 B2 | 8/2005 | Garcia et al. | |
| 6,947,133 B2 | 9/2005 | Wolleschensky | |
| 8,454,512 B2 | 6/2013 | Wang et al. | |
| 8,639,012 B2 | 1/2014 | Heng et al. | |
| 9,063,334 B2 | 6/2015 | Schultz | |
| 9,068,978 B2 | 6/2015 | Brucki et al. | |
| 9,091,654 B2 | 7/2015 | Heng et al. | |
| 9,360,410 B2 | 6/2016 | King et al. | |
| 9,470,700 B2 | 10/2016 | Uchikawa | |
| 9,500,644 B2 | 11/2016 | Schilffarth et al. | |
| 9,964,539 B2 | 5/2018 | Hamasaki et al. | |
| 10,598,597 B2* | 3/2020 | Bahlman ............ G02B 21/0076 | |
| 2001/0034025 A1* | 10/2001 | Modlin ................ C12Q 1/6816 | |
| | | | 435/6.11 |
| 2002/0131047 A1 | 9/2002 | Zarrabian et al. | |
| 2003/0031352 A1* | 2/2003 | Nelson ................ G01N 23/046 | |
| | | | 382/131 |
| 2006/0077383 A1 | 4/2006 | Knebel et al. | |
| 2007/0035818 A1 | 2/2007 | Bahatt et al. | |
| 2009/0015831 A1* | 1/2009 | Yguerabide ......... C12Q 1/6816 | |
| | | | 356/337 |
| 2009/0170214 A1 | 7/2009 | Meek et al. | |
| 2009/0230324 A1* | 9/2009 | Gratton .............. G01N 21/6428 | |
| | | | 250/459.1 |
| 2010/0177308 A1 | 7/2010 | Bohle et al. | |
| 2011/0008785 A1* | 1/2011 | Tan .......................... B01L 7/52 | |
| | | | 435/6.12 |
| 2012/0154801 A1 | 6/2012 | Carron et al. | |
| 2012/0183441 A1 | 7/2012 | Schilffarth et al. | |
| 2012/0267549 A1* | 10/2012 | Crozier ............. B01L 3/502715 | |
| | | | 250/432 R |
| 2014/0038259 A1 | 2/2014 | Chen | |
| 2014/0065637 A1 | 3/2014 | Kirk et al. | |
| 2014/0152986 A1 | 6/2014 | Trainer | |
| 2014/0218726 A1* | 8/2014 | Cheng ....................... G01J 3/02 | |
| | | | 356/301 |
| 2015/0355024 A1 | 12/2015 | Goldring et al. | |
| 2017/0322133 A1 | 11/2017 | Trainer | |
| 2018/0196246 A1* | 7/2018 | Bares .................... G01J 3/0208 | |
| 2018/0266884 A1 | 9/2018 | Xu | |
| 2018/0372634 A1 | 12/2018 | Krishnamoorthy et al. | |
| 2019/0025210 A1 | 1/2019 | Neijzen et al. | |
| 2019/0089914 A1 | 3/2019 | Richarte et al. | |
| 2019/0120753 A1 | 4/2019 | Prater et al. | |
| 2019/0120807 A1 | 4/2019 | Warner et al. | |
| 2019/0129094 A1 | 5/2019 | Lin | |
| 2018/0195124 A1 | 6/2019 | Bowen | |

OTHER PUBLICATIONS

Zucker, Robert M. "Quality assessment of confocal microscopy slide based systems: performance." Cytometry Part A: the journal of the International Society for Analytical Cytology 69.7 (2006): 659-676. https://onlinelibrary.wiley.com/doi/pdf/10.1002/cyto.a. 20314.

He, Wei, et al. "In vivo quantitation of rare circulating tumor cells by multiphoton intravital flow cytometry." Proceedings of the National Academy of Sciences 104.28 (2007): 11760-11765. https://www.pnas.org/content/pnas/104/28/11760.full.pdf.

Fan, G. Y., et al. "Video-rate scanning two-photon excitation fluorescence microscopy and ratio imaging with cameleons." Biophysical journal 76.5 (1999): 2412-2420. http://citeseerx.ist.psu.edu/viewdoc/download?.

Mcconnell, Gail, and Erling Riis. "Two-photon laser scanning fluorescence microscopy using photonic crystal fiber." Journal of biomedical optics 9.5 (2004): 922-928. https://www.spiedigitallibrary. org/journalArticle/Download?fullDOI=10.1117/1.1778734.

Denk, Winfried, James H. Strikler, and Watt W. Webb. "Two-photon laser scanning fluorescence microscopy." Science 248.4951 (1990): 73-76. https://pdfs.semanticscholar.org/566e/2663f897523d3309138a8469687626430771.pdf.

* cited by examiner

Figure 4 — Prior Art

METHOD AND APPARATUS OF FILTERING LIGHT USING A SPECTROMETER ENHANCED WITH ADDITIONAL SPECTRAL FILTERS WITH OPTICAL ANALYSIS OF FLUORESCENCE AND SCATTERED LIGHT FROM PARTICLES SUSPENDED IN A LIQUID MEDIUM USING CONFOCAL AND NON CONFOCAL ILLUMINATION AND IMAGING

RELATED APPLICATIONS

This application claims priority to Application Ser. No. 62/575,207 entitled Method and Apparatus for Optical Analysis and filed Oct. 20, 2017, priority as a Continuation in Part to application Ser. No. 16/049,727 entitled Method and Apparatus for Optical Analysis filed Jul. 30, 2018, Provisional Application No. 62/726,772 filed Sep. 4, 2018 and entitled Novel Method for Optical Analysis of Fluorescence and Scattered Light from Particles Suspended in a Liquid Medium Using Confocal and Area Illumination and Imaging, and which is incorporated herein by reference in its entirety. This application further claims priority to Provisional Application No. 62/734,607 entitled Novel Method of Filtering Light Using a Spectrometer Enhanced with Additional Spectral Filters and which Uses an Array of Independent Photodetectors to Measure the Signal for Each Fluorescence or scattered Light Channel filed Sep. 21, 2018 and which is also incorporated herein by reference in its entirety. This application further claims priority to Provisional Application No. 62/883,715, entitled Method for Analyzing Fluorescent Particles in Immunoassay filed Aug. 7, 2019.

FIELD OF THE INVENTION

The present invention relates generally to light filtration. More specifically, the present invention is a novel method and apparatus of filtering light using a spectrometer enhanced with additional spectral filters and which uses an array of independent photodetectors to measure the signal for each fluorescence or scattered light channel.

The present invention also relates generally to a novel method and apparatus of analyzing particles suspended in a liquid medium (a sample) by optical measurement of the fluorescence and light-scattering properties of the individual particles in the sample. More specifically, the present invention is a system that scans the liquid medium with one or more illumination sources and simultaneously records one or more components of scattered light and fluorescent light from each particle suspended in the liquid medium where the particles in the liquid medium are held stationary during the scan. The method of illuminating the sample and collecting and measuring the light emitted or scattered from each particle enables rapid, sensitive and accurate analysis of a large number of particles in a short time.

BACKGROUND OF THE INVENTION

The field of cytometry involves the measurement of properties of individual biological cells suspended in a liquid medium. Cytometry uses optical properties of the cells themselves, such as light scattering properties, to identify and classify individual cells in a sample as well as the use of fluorescent labels that may be selectively attached to certain cells to further identify cells. Multiple fluorescent labels may be used simultaneously, where each label can be distinguished by the spectral characteristics (color) of the light emitted by that label as well as the absorption and excitation of the label by illumination at different wavelengths.

Cytometry can be used to quantify parameters of a cell such as diameter, volume, number of particles in a given sample volume, particle shape and internal structure, and absence or presence of specific proteins, nucleic acids, or other biologically active molecules on the surface of or inside the particle. The state of health of the cells and whether or not the cells are reproducing may also be inferred from these or other measured parameters. Cytometry is used to study a large number of disease states including cancer and infectious diseases.

The field of fluorescence immunoassays uses microspheres made of polystyrene, silica, or other materials to perform similar analysis of samples. Instead of measuring properties of individual cells, the microspheres are used to detect the presence or absence of biologically active compounds in the liquid sample. Capture molecules such as antibodies or nucleic acid sequences are attached to the outer surface of the microspheres, and then the presence of the target compound in the sample is indicated using fluorescent labels added to the sample. Microsphere immunoassays are able to identify proteins, antibodies, compounds such as drugs of abuse, and specific nucleic acid sequences that may be present in the sample.

In related art, "immunoassay" may refer specifically to reactions where antibodies are used as the selective binding agent. In this disclosure, "immunoassay" includes any binding assay where a capture molecule is used that specifically binds to an analyte of interest. The analyte of interest could be a protein, nucleic acid, or other biologically active molecule for which a highly selective capture molecule exists or can be synthesized.

Flow cytometry is a technique within the field of cytometry that uses specially designed optically clear channels to present the particles (cells) in the sample one at a time to an optical system for measurement. The cells are typically illuminated by one or more focused lasers that illuminate only one cell at a time. The illumination could also be performed with other devices such as light emitting diodes, arc lamps, or other light sources. Flow cytometry is an efficient means of evaluating a large number of cells in a sample since the time required to measure each individual particle is on the order of a few microseconds. The properties that are typically recorded for each cell include forward scattered light, side scattered light, back-scattered light, and one or more colors of fluorescence used to identify the previously reference fluorescent labels. A flow cytometer might use one, two, or more lasers to collect the desired number of measurements for each particle or cell in the sample.

Flow cytometers are frequently used in the analysis of fluorescence immunoassays to perform the step of measuring the fluorescence and light-scattering properties of the particles used in these immunoassays. Improvements in the flow cytometry technology therefore have applicability both to cytometry, which involves the study of cells, and to the field of immunoassays.

Flow cytometry suffers a number of drawbacks which are addressed by the present invention. One drawback of flow cytometry results from the measurement of particles sequentially. In order to measure a large number of particles sequentially in a short period of time, the time allowed to measure each individual particle is necessarily short. A second drawback results from the method of illumination typically employed in flow cytometers. In order to provide highly uniform illumination to each particle, whose position may vary from particle to particle, a field of illumination substantially larger than the particle is necessary. Typically, an illumination field ten times the diameter of each particle or greater is necessary in order to obtain illumination for each particle that only varies by a few percent. Consequently, flow cytometers are only able to use a small percentage of the illumination to analyze each particle. Because the illumination source is many times brighter than what is needed to illuminate a particle, the amount of stray light in the optical system is also much higher than desirable. Excess stray light interferes with the flow cytometer's ability to detect and/or measure very weakly fluorescent particles. More efficient illumination, resulting in less stray light and thereby enabling greater sensitivity, would be highly desirable.

Scanning cytometry, or laser-scanning cytometry, uses a microscope equipped with an optical scanning system to analyze and measure a number of cells or microspheres presented for analysis on a microscope slide or otherwise presented for analysis. The samples are typically static; that is to say that particles being analyzed are spread out over a flat surface while being analyzed, and the optical system scans across the surface to evaluate the individual particles. Alternately, the slide holding the particles may be translated using a motorized stage beneath a fixed optical analysis system. Like a flow cytometer, a scanning cytometer is able to measure multiple fluorescence and light-scattering properties simultaneously.

Scanning cytometers address the illumination issues of flow cytometers by only illuminating the particle being analyzed with a focused light source (typically a laser). These instruments can use lower power illumination sources and have substantially less stray light than flow cytometers.

In addition to reducing stray light, better filtering of light according to wavelength would benefit both flow cytometers and scanning cytometers by increasing their sensitivity to weak fluorescence in the presence of light at the wavelength of the excitation source(s) scattered off of particles in the sample and fluorescence at wavelengths other than the range of wavelengths intended to be measured. An embodiment of this disclosure addresses this need by utilizing a dispersive optical element directing light towards an array of independent fluorescent light detectors in conjunction with additional spectral filters wherein each filter is matched with an independent photodetector to further shield against stray or background light to increase detection of weak fluorescence.

Because scanning cytometers image the sample, the particles in the image must remain as motionless as possible during the scan. Traditionally this has been accomplished by placing the sample in a microscope slide with a coverslip, fixing the particles (cells) to a slide, or studying cells that adhere to a solid surface. Scanning cytometers have not been used traditionally for immunoassays on microspheres primarily because of the difficulty of imaging moving particles suspended in a liquid. The present invention addresses the problem of particle motion within the sample as described herein, i.e., either by allowing the particles to settle under the influence of gravity or by holding them in place with a magnetic field.

Some prior art comprises a scanning cytometer used to image particles that have settled under the influence of gravity onto an optically clear surface, through which the particles are imaged. To the best of the inventor's knowledge, the prior art does not use confocal optics. For example, see published application US2004/0042007 entitled High Efficiency, Large Field Scanning Microscope, currently assigned to Molecular Devices LLC. Also see patent WO2007143615 entitled Systems and Methods for Performing Measurements of One or More Analytes Comprising Using Magnetic Particles and Applying a Magnetic Field, of Wayne D. Roth et al. Consequently, these systems suffer from a higher level of stray light-generated noise and are not as sensitive for measuring weak fluorescent signals as the present invention disclosed here.

In the description of the present invention, the word confocal is used to mean an optical system where the objective lens used to collect fluorescence and back-scattered light emanating from the particles in the sample is also used to focus the illumination source so that when the illumination source is aimed at a specific location within the sample stream, the fluorescence and scattered light photodetectors are also aimed at the same location.

A confocal design also includes an aperture or mask placed in an image plane of the objective lens to spatially filter light from points other than the focal point of the objective. The confocal design could also include optical elements placed after the aperture to focus the light passing through the aperture onto the photodetectors at a magnification suitable to match the size of the image of the sample to the sensitized area of the photodetectors.

SUMMARY OF THE DISCLOSURE

The present disclosure comprises an embodiment that may be used with both flow cytometry and scanning cytometry or fluorescence microscopy. The disclosure remedies the excess illumination, i.e., illumination that is many times brighter than what is needed to illuminate a particle, thereby contributing to the amount of stray light in the optical system being much higher than desirable. The disclosure achieves this by (i) focusing the illumination light to a point as small as or smaller than the particles of interest in the sample, and (ii) using less excitation light by not illuminating excess area in the sample. This remedy may be augmented by filtering light using a spectrometer enhanced with additional spectral filters and which uses an array of independent photodetectors to measure the signal for each fluorescence or scatter light channel, all as described herein.

In one embodiment of this disclosure, the detectors consist of an array of individual photodetectors. Each discrete detector is positioned to measure the light at a specific range of wavelengths. The gain of each detector may be set independently to the expected range of signal levels within that range of the electromagnetic spectrum.

In prior art using spectrometers to measure fluorescence, blocking filters may be incorporated in the path of all the light directed into the spectrometer to suppress light at the laser excitation wavelength. Alternately, the blocking filter may be installed internal to the spectrometer in such a way that all light reaching the detector is filtered together. Either of these practices could be incorporated in addition to the invention disclosed herein.

The present disclosure comprises a method and apparatus of analyzing particles suspended in a liquid medium wherein the particles may be coated to facilitate attachment of substances of interest, e.g., proteins. The proteins may be stained with fluorescent agents. The apparatus may generally consist of a means of presenting the liquid sample to an optical system for analysis. The liquid handling system may consist of an optically clear chamber or vessel with an optically clear, flat bottom through which the particles are analyzed.

In one embodiment of the present disclosure, the particles are denser than the liquid medium and consequently settle to the bottom of the analysis chamber. For example, the particles could be made of polystyrene (specific gravity=1.04) or silica (specific gravity>1.5) and could be suspended in a saline solution with a lower specific gravity.

In other embodiments, the present invention analyzes particles which are held in place using a magnetic field rather than gravity. In such other embodiments, the particles need not be imaged through the bottom of the chamber. In this embodiment, the particles being analyzed would contain, either internally or on their surface, magnetic particles that would respond to an externally-applied magnetic field. Here, the term 'magnetic' is meant to include both ferromagnetic, superparamagnetic, and paramagnetic materials.

The optical analysis may consist of a device that scans one or more light sources such as lasers across the plane in which the particles lie, while simultaneously recording one or more scattered light properties and/or one or more fluorescent properties of each particle. The particles in the sample may be biological cells, microspheres, or other particles. The analysis of each particle may take place substantially instantaneously (in real time). The analysis system may also record data from the particles either as a series of images or video which can be archived in a data storage system and/or further analyzed at a later time.

The particles may be positioned in a tray containing multiple wells of samples such as a chamber slide or a microtiter plate. The tray can be moveably oriented to the light source and detectors. The moveable positioning of the tray in relation to the light source and detectors may utilize stepper motors. The movement may be controlled by a CPU.

The optical analysis system comprises a confocal optical system where an objective lens is used both to focus the illumination sources on the particle and to image light scattered and emitted from the particles onto one or more detectors. The detectors may be photodiodes, photomultipliers, CCD's (charge coupled device), or other optical sensors. The illumination sources may be focused to an area sized to illuminate only one particle at a time, and the lenses and apertures (or mask) in the optical analysis system may be designed proximate to the image plane of the objective lens to spatially filter out stray light which might otherwise interfere with analysis of the particle.

The illumination sources, where more than one illumination source is used, may be focused to the same area or they may be separated in space to enable sequential excitation of each particle by each illumination source. In the case where the illumination sources are focused on different locations within the sample, scattered light and fluorescent light emitted from the particle corresponding to each illumination source would be simultaneously focused on detectors equipped to detect scattered light and fluorescent light pertaining to that illumination source (the detectors would image slightly different locations within the sample at any given time).

The optical analysis system may comprise an additional illumination source (or sources) and one or more additional photodetectors that are not confocal (the area illumination and imaging system), and which are used to record a two-dimensional image of the sample while the confocal optical system scans the sample. The area illumination and imaging system enables identification of the particles in the sample by characteristics such as size, opacity, or fluorescence in portions of the electromagnetic spectrum different from the portions of the spectrum in which the confocal system detects scattered and fluorescent light. The area illumination and imaging system also facilitates fast focusing of the sample as well as detection of particle motion. Excessive particle motion interferes with accurate imaging of the sample and measurement of fluorescence and scattered light intensities of particles within the sample.

BRIEF DESCRIPTION OF THE DRAWINGS

The accompanying drawings, which are incorporated in and constitute a part of the specification, illustrate preferred embodiments of the disclosure. These drawings, together with the general description of the disclosure given above and the detailed description of the preferred embodiments given below, serve to explain the principles of the disclosure.

DETAIL DESCRIPTIONS OF THE INVENTION

All illustrations of the drawings are for the purpose of describing selected versions of the present invention and are not intended to limit the scope of the present invention.

The disclosure includes a method and apparatus for measurement of fluorescence. Measurement of fluorescence is an integral part of many applications in clinical and life sciences testing as well as biological research applications. Specific fields that utilize fluorescence include microscopy, spectrometry, fluorimetry, flow cytometry, microarray scanning, nucleic acid sequencing and nucleic acid detection. Increasing sensitivity of the fluorescent signal that can be measured is an important goal within these fields, since the ability to detect weaker signals with greater confidence results in better sensitivity and better accuracy for the overall application. In many applications where fluorescence is studied the need also exists to separate the fluorescence into different spectral components according to the wavelength of the fluorescent light.

Fluorescent light results from the excitation of a fluorescent molecule (dye) with light at a wavelength lower than the emission wavelength range of the dye. For example, many fluorescent dyes are easily excited by light at 488 nm and then emit fluorescent light at wavelengths longer than 488 nm. In such applications, the excitation energy is supplied either by a laser that emits light at the desired wavelength or using a broadband light source such as an arc lamp or LED and then filtering the excitation light to remove, using optical filters, light at wavelengths that would interfere with measurements of the fluorescence.

The optical system used to detect the fluorescence typically employs a means of blocking or filtering light at the excitation wavelength so that only fluorescent light is detected. Frequently, a combination of interference filters is used to selectively transmit the fluorescent light while rejecting as much of the excitation wavelength as possible.

Figure 1:
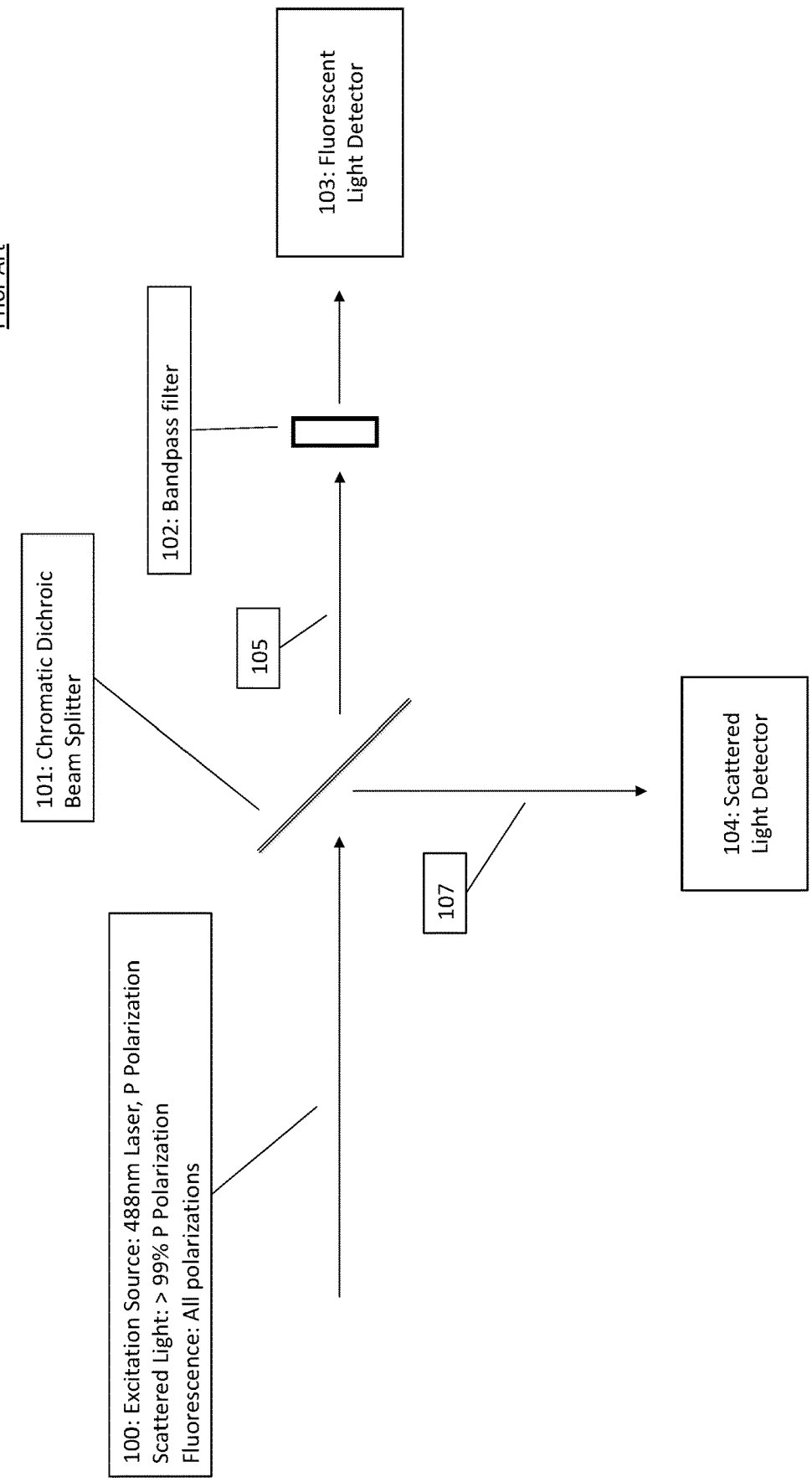
FIG. 1 is a diagram of the positioning of a dichroic beam splitter with a light source, scattered light detector and fluorescent light detector used to measure fluorescence and scattered light from a sample.

FIG. 1 shows an example of such a system that might be used in a flow cytometer, where a dichroic beam splitter 101 is used to reflect light at the excitation wavelength to a scattered light detector 104. The majority of the light entering the system 100 is light emanating from a particle that is being analyzed individually. The majority of the light emanating from a single particle will be light from the excitation source (488 nm laser) that is scattered off of the particle. A much smaller component of the light entering the system will be fluorescent light emitted by fluorescent molecules either attached to the surface of the particle or imbedded within the particle. This fluorescence will comprise photons at wavelengths longer than the excitation wavelength (488 nm in this example).

While the type of fluorescence discussed in this specification is single-photon fluorescence (in which the fluorescent light is always emitted at a wavelength that is longer than the excitation wavelength), it will be appreciated that the disclosure apparatus and method applies equally to measurements of multi-photon fluorescence from particles. In multi-photon fluorescent applications, the fluorescent light is emitted at wavelengths that are typically shorter than the excitation wavelength.

Figure 2:
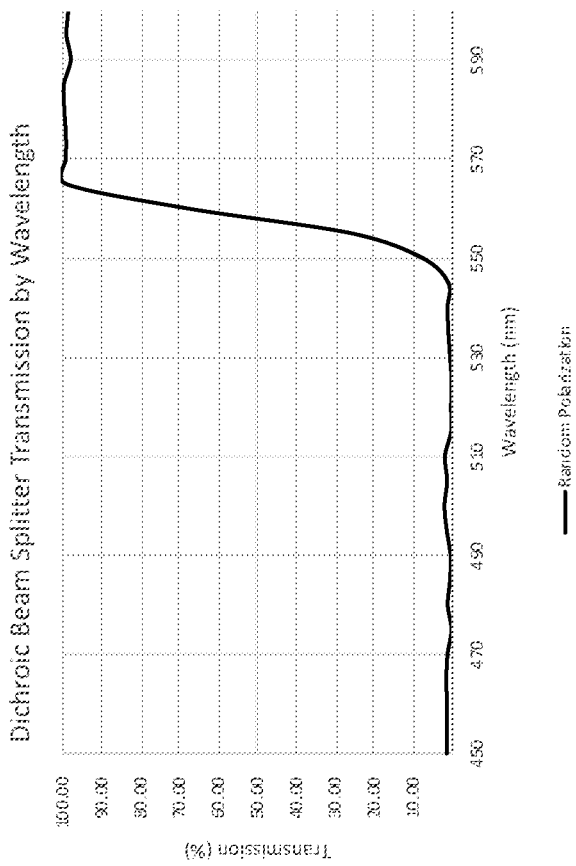
FIG. 2 is a graph of the dichroic beam splitter transmission by wavelength.

As can be seen in FIG. 2, the dichroic beam splitter 101 (FIG. 1) reflects light at the excitation wavelength (488 nm) and transmits light at wavelengths longer than 550 nm. It will be appreciated that the fluorescent light, typically having a different (here longer) wavelength than the excitation light, will be transmitted through the dichroic beam splitter 101. This is disclosed on the Y or vertical axis showing the percentage of light transmitted. The majority of the fluorescent light will be transmitted by the beam splitter 101. A typical dichroic will also allow 1% or more of the excitation energy to be transmitted, so a bandpass filter 102 is frequently used to further filter the light before it is measured by the fluorescent light detector 103. The bandpass filter 102 is typically able to reject light at the excitation wavelength to such a degree that 1 part per million or less of the excitation energy pass through the bandpass filter 102. The combined effects of the dichroic beam splitter 101 and the bandpass filter 102 result in blocking of the excitation energy such that 1 part per 100 million of the original excitation energies reaches the fluorescent light detector 103.

FIG. 1 discloses the combination of the performance of the beam splitter and bandpass filter. The combined performance of the beam splitter 101 and bandpass filter 102 determine a practical limit of the system's ability to detect weak fluorescent signals. The best bandpass filters available today can be verified to block light at an optical density of 8.

It will be appreciated that methods of illuminating cells, particularly in flow analysis, utilize a broad field of illumination. Typically, an illumination field ten times the diameter of each particle or greater is necessary in order to obtain illumination for each particle that only varies by a few percent. Because the illumination source is many times brighter than what is needed to illuminate a particle, the amount of stray light in the optical system may be multiple orders of magnitude higher than the fluorescent signal. Excess stray light interferes with the ability to detect very weakly fluorescent signals.

Therefore, confidently measuring the fluorescence from single molecules of fluorescent dye is very difficult, since the fluorescent signal from a single dye molecule is at or below the level of scattered light from the excitation source that ultimately reaches the detector. An improvement in the ability to separate light according to wavelength over the current state of the art would be desirable because it would lead to improvements in the sensitivity of instruments that measure fluorescence.

Figure 3:
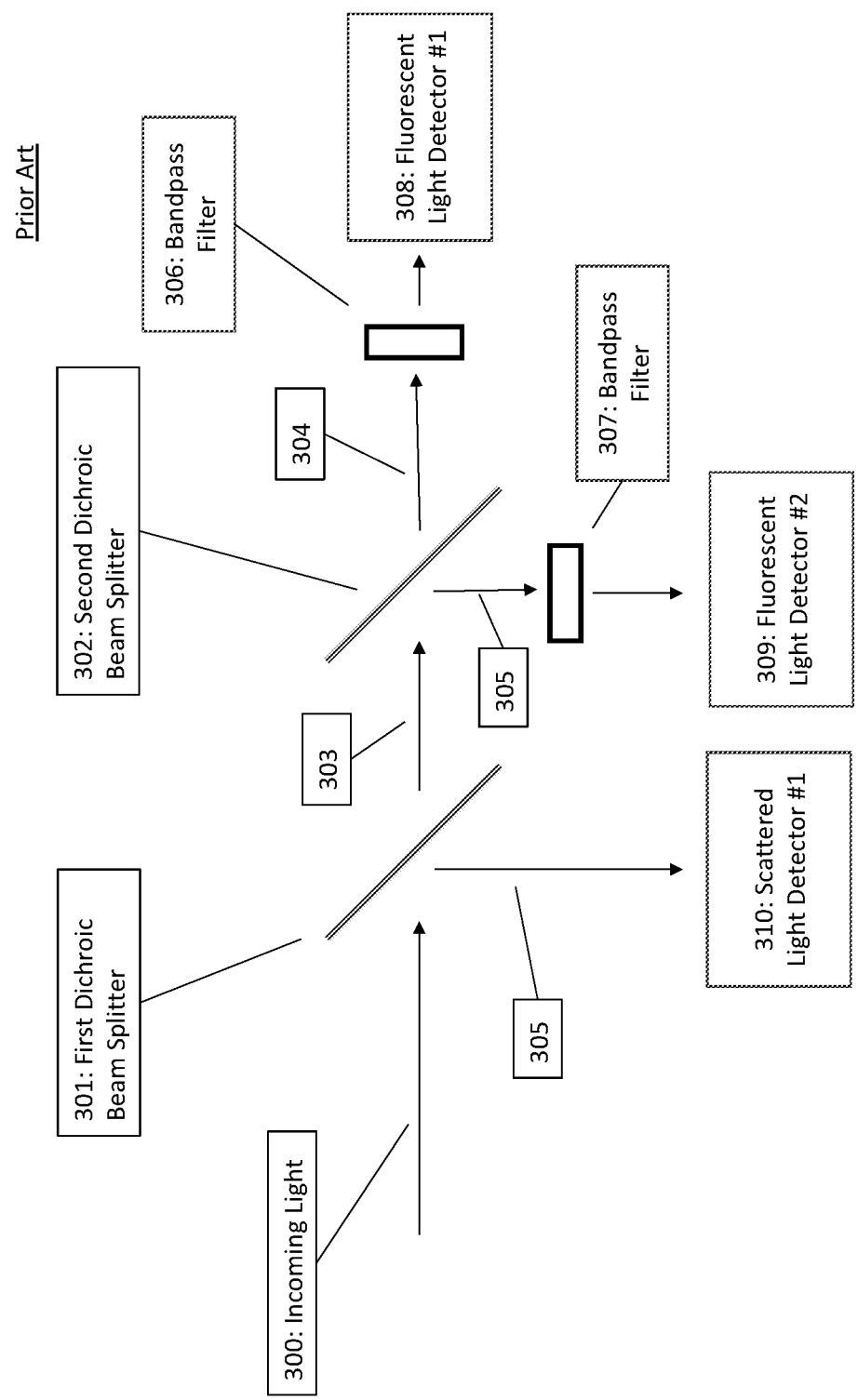
FIG. 3 is a schematic of an optical system to detect multiple fluorescence signals.

FIG. 3 illustrates an application where two colors of fluorescence must be detected simultaneously. A first dichroic beamsplitter 301 reflects the majority of the light at the wavelength of the excitation source to scattered light detector #1 310. A second dichroic beam splitter 302 is employed to divide the fluorescent signal into two components based on the wavelength of the light. If the second dichroic beam splitter 302 is a long-pass filter, then Fluorescent Light Detector #1 308 would measure fluorescent light at longer wavelengths relative to Fluorescent Light Detector #2 309.

Returning to the previous example where the excitation source is a 488 nm laser, Fluorescent Light Detector #1 308 could measure fluorescence at wavelengths ranging from 565 nm up to 600 nm and Fluorescent Light Detector #2 could measure fluorescence at wavelengths ranging from 500 nm to 550 nm. Measuring scattered light and fluorescence at multiple wavelength ranges is a very common application in fluorescence microscopy and flow cytometry.

It will be obvious to one skilled in the art that the number of colors of fluorescence that could be measured in this manner is arbitrarily large, but each additional measurement (referred to herein as a "fluorescence channel") increases the number of dichroic beam splitters, and photodetectors. There are several significant drawbacks to this approach. Each optical surface introduced into the system results in loss of light through absorption and reflections. Also each additional component introduces another element that must be aligned to a photodetector. It will be appreciated that each additional component, e.g., dichroic beamsplitter (dividing incident light into two separate beams), increases the cost and complexity of the system. Additionally, the accumulated loss of light through absorption and reflection compounds the problem of detecting weak fluorescence.

In many commercially available systems, 4 or more fluorescence channels are employed to measure the fluorescence in response to each excitation source. Commercially available flow cytometers and fluorescence microscopy systems typically employ more than one and in some cases 4 or more excitation sources. The number of fluorescence channels needed to measure all the possible fluorescence signals from such a system may be 20 or higher, resulting in high complexity, difficulty in calibration and cost.

Figure 4:
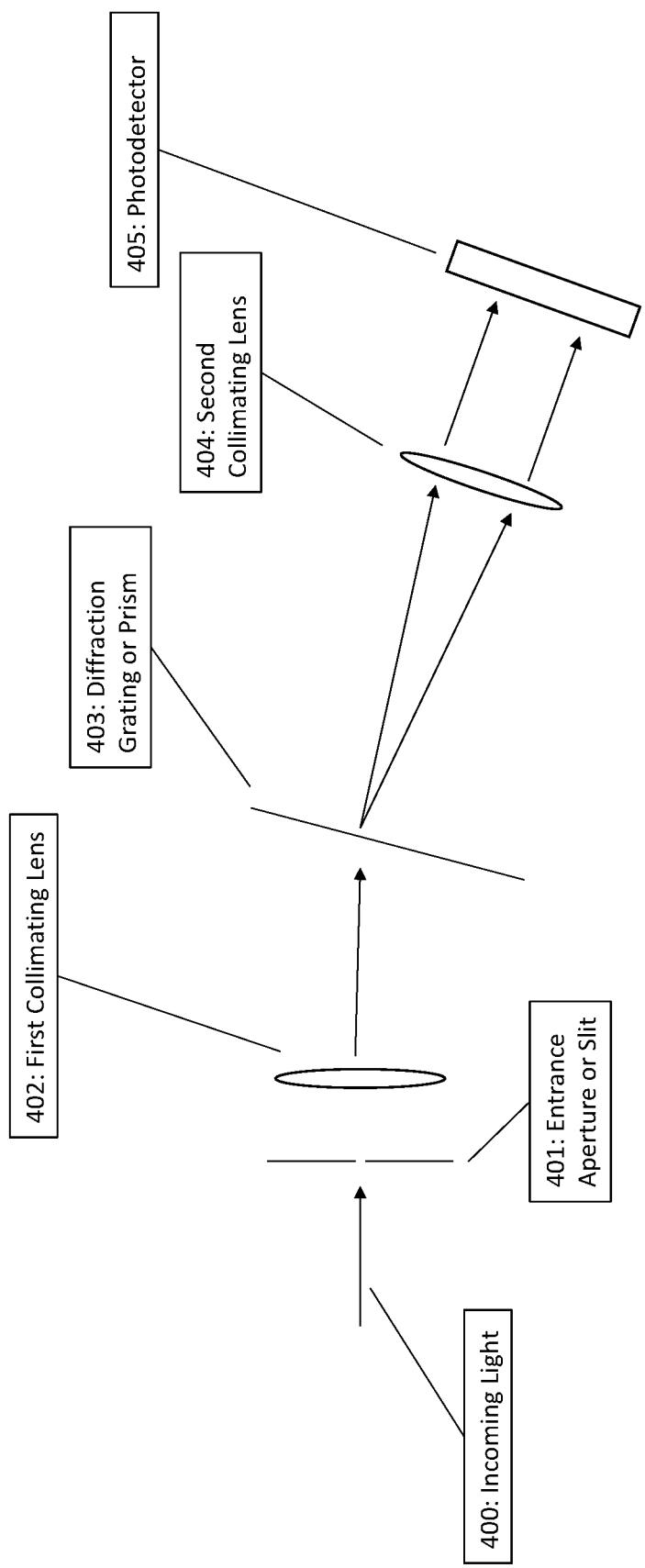
FIG. 4 is a diagram drawing depicting how a typical spectrometer works.

One solution has been the use of a spectrometer to simultaneously measure the spectral content of the fluorescence and scattered light signal across a broad range of the electromagnetic spectrum. An example of such a device is illustrated in FIG. 4. Incoming light 400 (which contains both light from the excitation source(s) as well as fluorescent light) enters the system through an aperture 401, which could be a slit or a circular aperture such as a pinhole. The light is focused into a collimated beam by a first collimating lens 402, and then strikes a light spectrum producing device, e.g., diffraction grating or prism 403. The light is then dispersed at different angles according to wavelength. A second lens 404 focuses the dispersed light into a collimated beam which is then measured by a photodetector. In an instrument such as a flow cytometer or laser-scanning fluorescence microscope, a photodetector 405 with high bandwidth (such as a multi-channel photomultiplier tube) is typically used. In order to measure fluorescence in multiple regions of the visible or other electromagnetic spectra, a detector with multiple detection channels (such as a 32-channel photomultiplier tube) must be used. Each channel of the detector 405 registers a different component of the signal according to wavelength. In applications where lower bandwidth is acceptable, a detector comprised of an array of photosensitive pixels such as a CMOS (complementary metal-oxide semiconductor) array or CCD could be used as the photodetector 405.

Spectrometers typically used in this manner have drawbacks especially where one signal (such as scattered light from the excitation source) is several orders of magnitude larger than a different signal (such as a very weak fluorescence signal). One drawback is the need to set the gain of the photodetector at the same level for all the fluorescence channels. Very high gain would be desirable for the measurement of weak fluorescence but would result in saturation of the detector circuitry for very strong signals. Lower gain would prevent any of the channels from saturating but would be inadequate for the detection of very weak signals. Another limitation is the tendency of multi-channel PMTs (photo multiplier tube) or CMOS/CCD arrays to "bloom", where very strong signals in one part of the detector spill over into neighboring areas of the detector and render very weak signals unmeasurable. A third drawback is the tendency for stray light at the excitation wavelengths to scatter off of components inside the spectrometer and into regions of the photodetector that are supposed to measure fluorescence, creating unwanted noise. This unwanted noise from stray light also limits the system's ability to measure very weak fluorescence signals.

Figure 5:
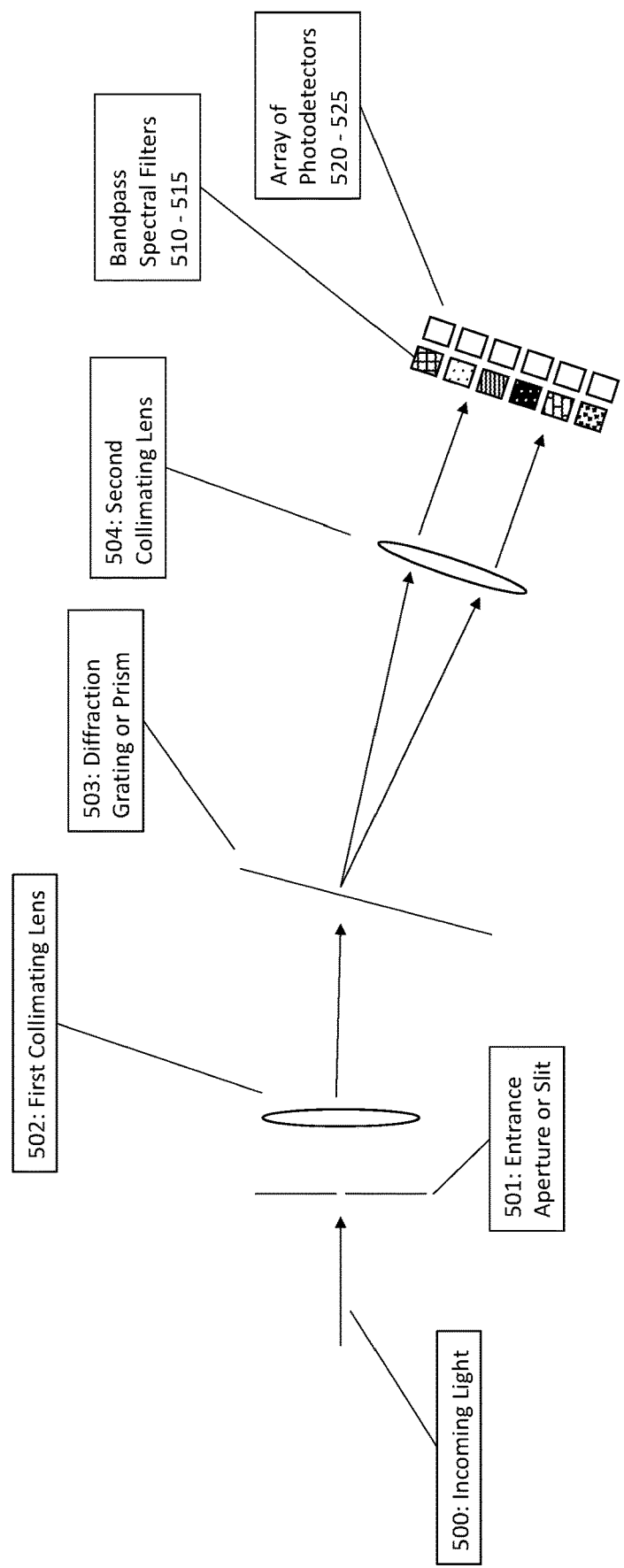
FIG. 5 is an overview of the method and apparatus of the disclosure utilizing a diffraction grating or prism, first and second collimating lenses, multiple selected bandpass filters and array of photodetectors. In an embodiment, the photodetectors can be complementary in sensitivity to the selected bandpass filters.

This disclosure teaches a combination of the spectrum producing device (diffraction grating or prism), a collimating lens and multiple spectral filters (each having specified receptivity or blocking characteristics) aligned with a complementary specified photodetector wherein the photodetector has a complementary sensitivity. The disclosure includes filtering light using a spectrometer enhanced with additional spectral filters and which uses an array of independent photodetectors to measure the signal for each fluorescence or scattered light channel. One possible embodiment is shown in FIG. 5.

As in FIG. 4, incident light 500 enters the system through an aperture 501 and is collimated by a first collimating lens 502 into a beam which is focused onto a diffraction grating 503 (or other means of dispersing light according to wavelength). The dispersed beam is focused into a collimated beam by a second collimating lens 504. In contrast with prior art as illustrated in FIG. 4, the disclosure teaches use of multiple and complementary selected combination of spectral filters and photodetectors.

The detectors consist of an array of individual photodetectors 520-525 such as PIN diodes, silicon photomultipliers, avalanche photodiodes, or photomultiplier tubes. Each discrete detector is positioned to measure the light at a specific range of wavelengths. The gain of each detector may be set independently to tune the sensitivity and dynamic range of that detector to the expected range of signal levels within that range of the electromagnetic spectrum. It will be appreciated this can compensate for the high strength of scattered excitation light or very bright fluorescence signals verses relatively weak fluorescence signals.

In front of one or more of the photodetectors 520-525, a spectral filter 510-515 (which could be a bandpass filter, longpass filter, notch filter, or shortpass filter) may be inserted to selectively block light at wavelengths other than the range of wavelengths that detector is intended to measure. The additional detector-specific filter is intended to augment the function of the diffraction grating 503 by eliminating stray light that would otherwise have been measured by the detector. FIG. 5 shows a system with 6 photodetectors 520-525, each of which has its own bandpass filter 510-515. In practice, the number of detectors and the number of filters could be higher or lower than 6.

Some of the channels, such as those measuring scattered light at the excitation wavelength, might not need any optical filtering other than that provided by the diffraction grating 503. In such a case, no spectral filter need be installed in front of that particular detector.

The spectral resolution of this system (i.e. the range of wavelengths measured by each detector) is a function of the size of the photosensitive area of the detectors 520-525, the magnification of the first 502 and second collimating lenses 504, and the power of dispersion of the grating or prism 503. The spectral filtering system allows selection of a spectral resolution by specifying the appropriate diffraction grating, collimating lenses, and detectors.

The disclosure teaches a method and apparatus for achieving accurate measurement of relatively weak light signals, such as fluorescence signals, within a specified wavelength range that exist in an environment of broad and intense excitation light (which could be stray light or light scattered off of particles). The disclosure teaches an apparatus of minimal complexity combined with flexibility.

Photodetectors typically have different sensitivities at different wavelengths. For a system that measures a broad range of wavelengths, it would be advantageous to use different types of detectors for different wavelengths. An embodiment of the present invention could include the use of different types of photodetectors for each channel such that each channel has the desired sensitivity in the range of wavelengths measured by that detector.

All of the photodetectors could be mounted on a single circuit board, so that the complexity of this system need not be any higher than a typical commercially available spectrometer.

The present invention addresses the drawbacks of prior art described in the background section:

The use of the appropriate detector (such as a PMT) provides very high bandwidth compared to a CMOS array or CCD detector;

The use of independent detectors with independent gain control for each channel allows the user to tune each detector independently to match the expected signal in that channel;

The complexity of this system is much lower than the photo detection system in a typical flow cytometer built according to FIG. 3 which employs 3 or more channels;

The ability of the system to detect weak fluorescence signals will be very high because the optical filtering ability of the diffraction grating in combination with a bandpass filter will be higher than the combination of the dichroic beam splitter and the bandpass filter shown for each channel of detection in FIG. 3; and Because each photodetector is a discrete component, no blooming between adjacent detectors is possible.

There are many novel alternative ways the present invention could be practiced. Some include:

The use of polarizing filters in addition to the components described here to selectively block light at one polarization while admitting light at other polarizations;

The use of an optical filter designed to block specific wavelengths (or polarizations) placed in the path of the beam of light prior to the entrance aperture of the spectrometer to block light of certain wavelengths (or polarizations) from reaching the array of detectors, in addition to the other optical filters and/or dispersive elements, sensitive to complementary specified wavelength to increase rejection of out-of-band light (such as light at the excitation wavelength) that would otherwise be measured by the fluorescence detectors;

The use of photodetectors other than the types of photodetectors named here, but which provide similar functionality;

The use of neutral density filters placed in the optical path of certain detectors to reduce undesirably large signals;

The use of lenses placed in front of each photodetector to enable the use of smaller photodetectors;

An optical design where the collimating lenses shown in FIG. 5 are replaced by mirrors, are placed outside the system, or are omitted entirely; and The addition of lenses or mirrors that do not change the functionality of the present invention but are included to alter the form factor (such as fold mirrors used to make the optical path more compact).

In another embodiment of the present invention, a scanning analysis system may be utilized. In one embodiment, this scanning analysis system may be used in conjunction with the combined spectrometer, collimating lens, spectral filter and photodetectors described above.

Figure 6:
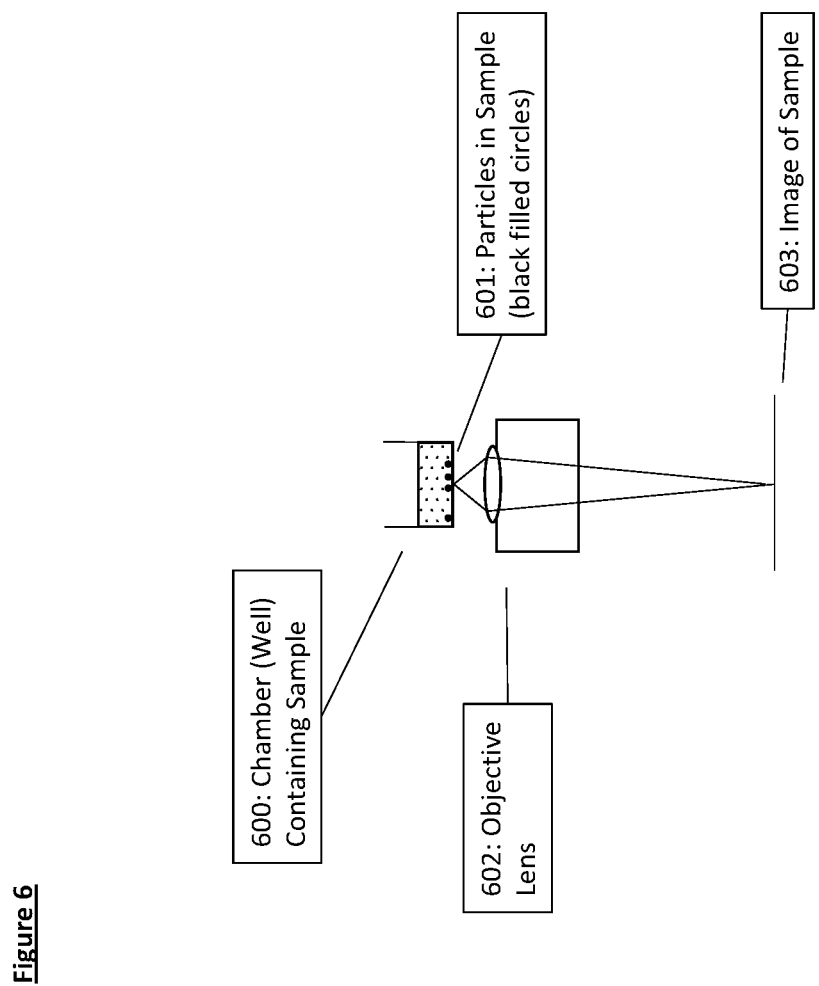
FIG. 6 shows a liquid sample containing particles which have settled to the bottom of a chamber and which are imaged through the bottom of the chamber, which is optically clear.

In this scanning analysis embodiment, a liquid sample is introduced to the system for analysis. The sample may be contained within a chamber (well) 600 having at least one optically clear, flat side, as illustrated in FIG. 6. It will be appreciated that the sample container may consist of 96 chambers and dimensioned for industry standards.

The sample can be a majority of water or saline solution with a number of particles 601 to be analyzed held in suspension in the sample. The particles may be coated to facilitate attachment of substances of interest, e.g., proteins. The particles may also have a coating of receptors for the attachment of fluorescent markers or labels. The particles 601 in the sample are denser than the liquid medium and would settle to the bottom of the well 600, which is optically clear. Once settled, the particles 601 remain sufficiently immobile so that the scanning optical analysis system (to be described in detail in following paragraphs and represented graphically here as Objective Lens 602) can generate an image of the particle 603 at sufficient resolution to independently measure scattered and fluorescent light from each particle.

Figure 7:
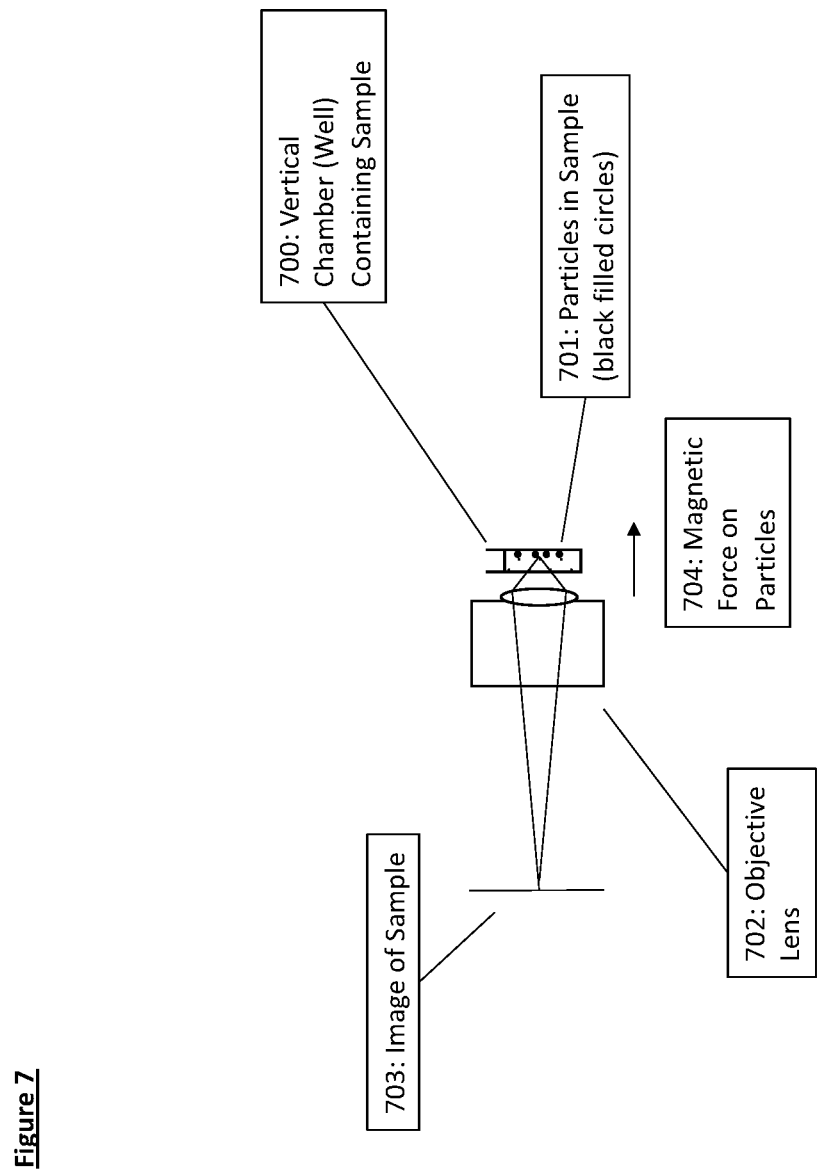
FIG. 7 shows a liquid sample with particles which are held against one side of a chamber by a magnetic field and which are imaged through a different side of the chamber, which is optically clear.

In other embodiments such as the one shown in FIG. 7, the particles in the sample 701 are held in place by a force other than gravity. One such embodiment comprises imbedding magnetic material within each particle and using a magnetic field 704 to attract the particles to one side of the well 700. A different side of the well 700 (for example the side opposite from the side to which the particles are attracted) is optically clear and the optical analysis system (to be described in detail in following paragraphs, and represented graphically here as Objective Lens 702) generates an image 703, through the optically clear side of the well 700, of the particles while held in place with the magnetic field.

Figure 8:
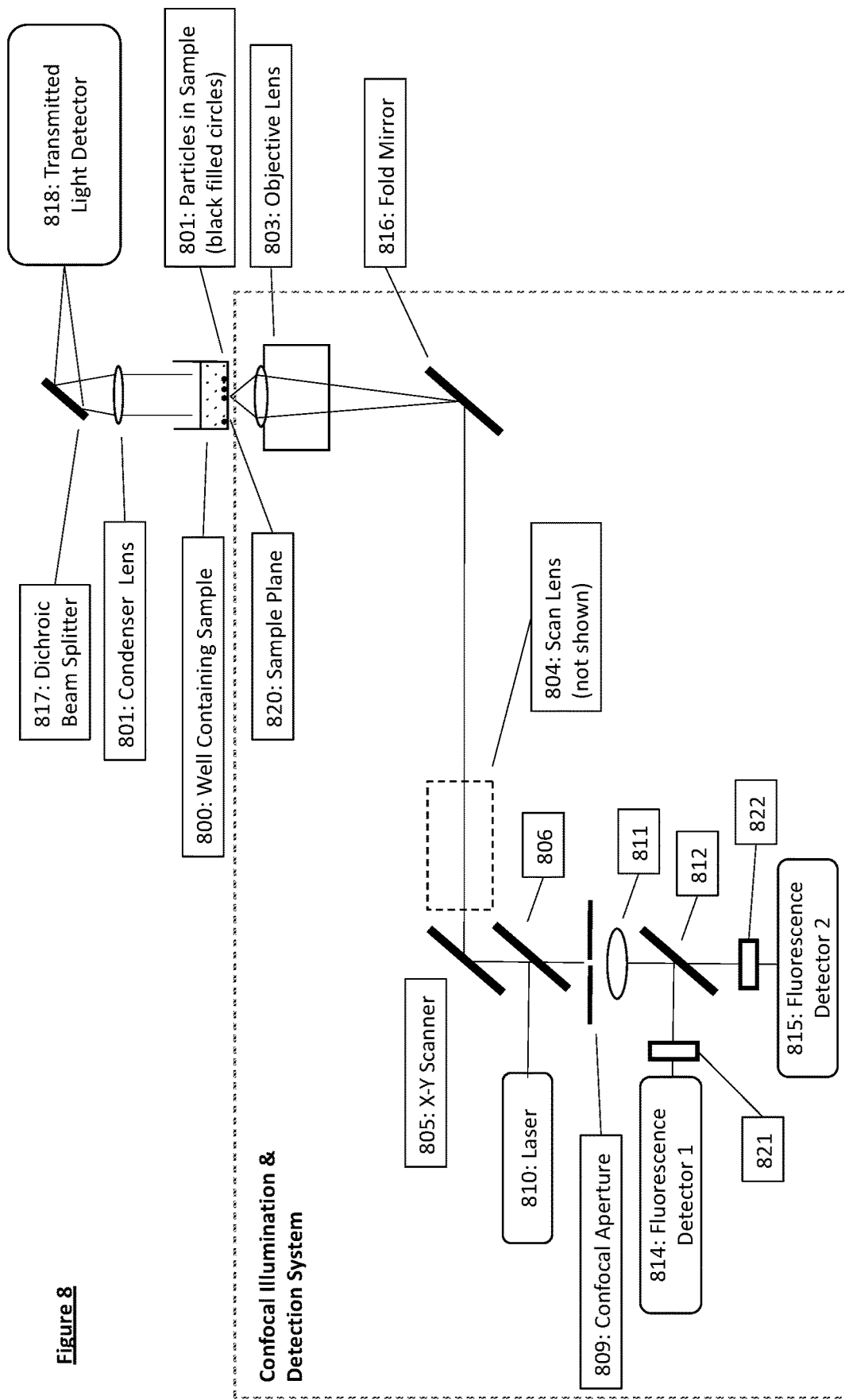
FIG. 8 shows an optical analysis system consisting of a sample contained in a well and a confocal illumination and detection system with a single illumination source (laser) and multiple photodetectors.

FIG. 8 illustrates how particles in the sample 801 can be scanned by one or more illumination sources such as a laser 810. Each illumination source 810 is focused to a small spot which could have a Gaussian intensity profile measuring 1-5 microns in diameter (measured at the $1/e^2$ illumination level). The mean diameter of the particles in the sample 801 is 1-20 microns. If multiple illumination sources of different wavelengths are used, the illumination sources can be focused to the same point within the sample or separated in space by a distance that is greater than the size of an individual illumination spot (such as 25 microns). The focused image of the illumination sources is scanned rapidly across the sample using a two-axis scanning mirror 805 and scan lens 804 in conjunction with objective lens 803. This allows rapid scanning of the entire field of view of the Objective Lens 803. One or more images of the sample may be captured for later analysis. It will be appreciated that each image of the sample may comprise a set of images, each of which is derived from the light detected by one of the detectors 814, 815 and 818 and thereby captures an image of the same sample in a unique portion of the electromagnetic spectrum.

In the instance where the images of the multiple illumination sources are separated in space, each particle within the sample 801 is illuminated sequentially by each illumination source as the two illumination sources traverse across the sample and all fluorescent light emitted in response to the illumination sources and all light scattered by the particles 801 from each illumination source occurs at different instances in time as well as different physical locations.

The size of the focused illumination source (or sources) 810 can be larger than the particles 801 being analyzed, smaller than the particles 801 analyzed, or approximately the same size as the particles 801. Using illumination covering a larger area than a single particle results in longer illumination periods for each particle 801, which would be advantageous for improving the accuracy of the measurements for each particle 801. Making the illumination smaller than the particle size can be advantageous to gain information about the structure of each particle 801, such as size, shape, surface texture or presence of internal bodies within a particle 801.

The width of the area scanned by the optical system may be configured in real time by adjusting the scanning mirror 805 (such as a galvanometric scanner). The scanning mirror may be gimbal mounted. The system may also use a folding mirror 816. The design may also include any number of flat fold mirrors used to bend the optical path into more convenient configurations. The scan mirror 805 can scan at a faster speed to image more area, with more particles 801, in a given period of time. Alternately, the scan mirror 805 can scan at a slower speed and with successive scans separated by a smaller distance, to provide greater spatial resolution and accuracy.

The system utilizes confocal imaging, whereby an aperture 809 (such as a pinhole with a diameter of 50 µm) is placed at the image plane formed by the objective lens 803 in combination with the scan lens. The aperture 809 filters out light from planes other than the sample plane 820, minimizing contribution of light on the photodetector(s) from locations that are not in focus. Using this type of optical system results in increased sensitivity compared to other types of imaging systems such as a widefield fluorescence microscope or a flow cytometer with detection optics similar to FIG. 3 because fluorescent materials at points outside the particle of interest 801 are either not excited, and consequently do not generate fluorescent light, or are spatially filtered from the light that reaches the detectors 814 and 815. In addition, the rejection of light from planes other than the sample plane 820 enables three-dimensional scanning of the sample by successively imaging two-dimensional scans of the sample 801 at different depths within the sample volume. Adjustment of the focal plane of the objective lens allows scan at multiple depths to generate a three-dimensional image of the sample using successive two-dimensional scans.

As the system scans the sample 801 point by point, the photodetectors 818, 814, and 815 record the amount of fluorescent and scattered light emanating from each point within the sample.

In FIG. 8, two detectors 814 and 815 are shown collecting fluorescent light. Each detector utilizes a combination of spectral filters, e.g., bandpass filters 821 and 822, and dichroic beam splitter 812 to accept light into the detector within a select region of the electromagnetic spectrum that is unique with respect to spectra recorded by other photodetectors in the system. In addition to fluorescence, a transmitted light detector 818 records light transmitted through the sample 801 and scattered by particles within the sample 801. This transmitted light detector 818 measures light at the wavelength of the illumination source. It may be convenient, although not necessary, to insert a dichroic beam splitter 817 (which could also be a fold mirror or a beam splitter that is not a dichroic) both to make the detection system more compact and to provide attenuation or filtration of the excitation light that reaches the detector 818.

While FIG. 8 depicts only a single illumination source (a laser in this instance), multiple illumination sources could be used in the same system. Each illumination source could be a laser or another type of light-emitting device such as a light-emitting diode (LED) or arc lamp in combination with suitable bandpass filters and optical elements to provide the desired intensity and range of wavelengths for illumination.

It will be appreciated that the means of delivering illumination light to the sample and collecting light emitted by the sample could be implemented using optical fibers as opposed to the free-space optical design illustrated in FIG. 8. Incorporating optical fibers into the design would constitute a design choice that does not alter the purpose or usefulness of the present invention.

Figure 9:
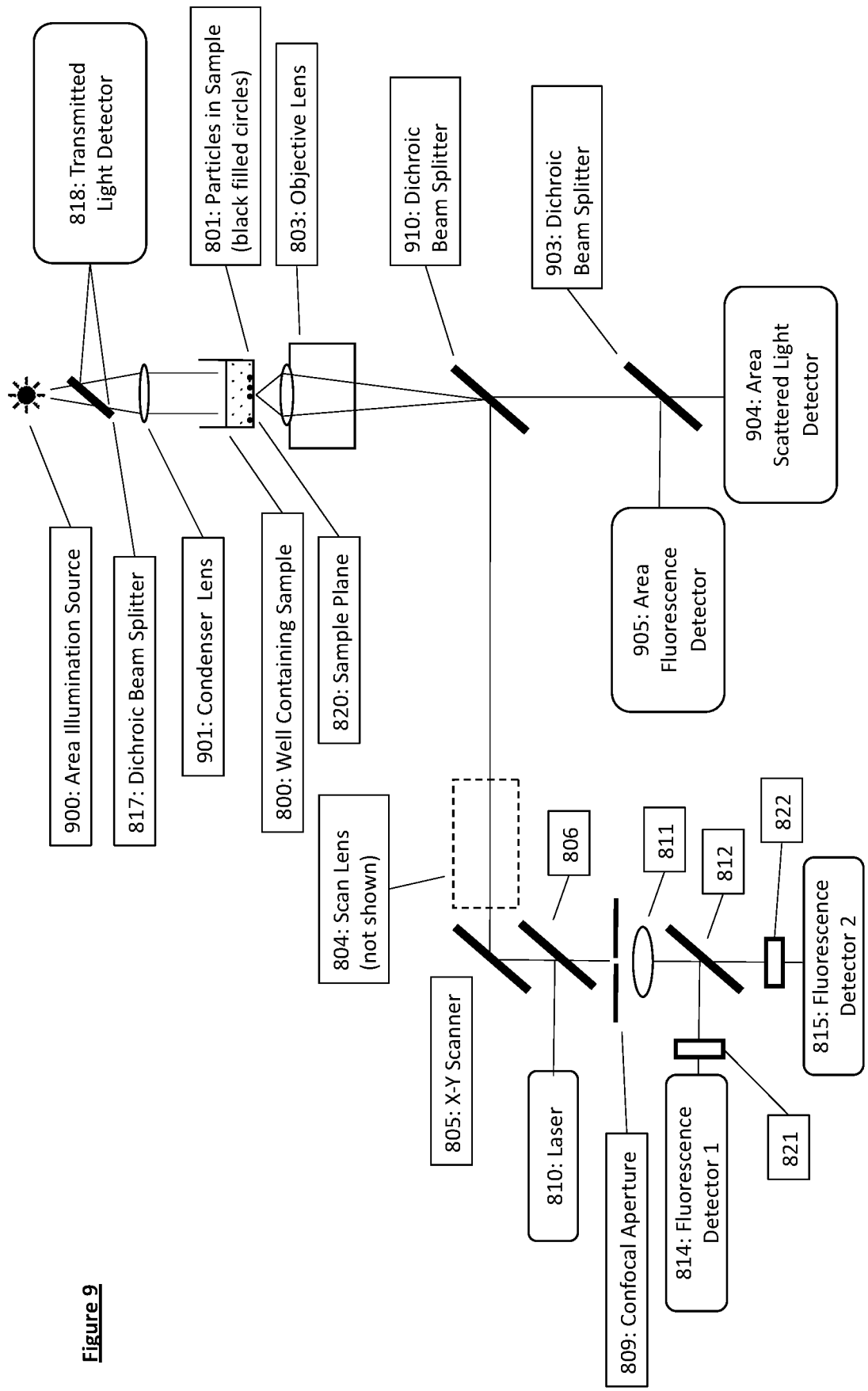
FIG. 9 shows the optical analysis system from FIG. 8 with an additional area illumination source and multiple area photodetectors.

FIG. 9 depicts the optical analysis system of FIG. 8 with the addition of an area illumination source 900 and area photodetectors 904 and 905. The area illumination source 900 provides light at a different wavelength than the confocal illumination source 810. For example, the confocal illumination source 810 could be a laser operating at a wavelength of 488 nm and the area illumination 900 could be a light-emitting diode with bandpass filters that in combination deliver light at wavelengths between 625 nm and 645 nm. The area illumination source 900 could alternately be a laser or other light source. The area detectors 904 and 905 shown in FIG. 9 comprise: 1) one detector that measures light at the wavelength of the area illumination source 904 which is scattered or absorbed by particles in the sample; and 2) one fluorescent light detector 905 which in combination with bandpass filters (not shown) measures fluorescent light emitted by the particles 801 at wavelengths longer than 645 nm in response to the area illumination source 900. The area illuminating light source may allow simultaneous image capture of the entire sample within the field of view of the objective lens 803. The detectors for such light source may be CCD or CMOS cameras.

The area illumination source 900 can also facilitate rapid focusing of the objective lens and provide a means of confirming that the particles 801 are in a static position as well as identification of any particles 801 that are not sufficiently static to obtain an accurate measurement of the particle's fluorescence and scattered light density.

A dichroic beam splitter 910 placed in the optical path between the objective lens and the scanning apparatus reflects light at wavelengths matching the confocal illumination source 810 and detectors 814 and 815 while transmitting light pertaining to the area illumination source 900 and detectors 904 and 905.

It will be appreciated that alternate configurations achieving the same result are possible. It will also be appreciated that more than one area illumination source could be incorporated into the same system with additional photodetectors corresponding to each additional illumination source.

The system shown in FIG. 9 may be operated in a mode where the confocal and area illumination and imaging takes place simultaneously, or the illumination and detection could be alternated such that only one illumination source is active at a time.

The system shown in FIG. 9 is capable of detecting and identifying more fluorescent materials than the simple sum of fluorescence detectors shown. By selecting two fluorescent dyes that both emit in the band detected by a given detector, but which are preferentially excited by different wavelengths, each of the detectors that registers wavelengths as long as or longer than the illumination source with the longest wavelength can potentially measure and distinguish two different fluorescent compounds (herein called dyes). Again, the system may utilize multiple light sources, e.g., lasers. To measure multiple dyes independently using one detector would require that the sample is imaged multiple times, where only the illumination source that preferentially excites a given dye is used for each image.

For example, two dyes that emit fluorescent light between 650 nm and 700 nm but are preferentially excited at 488 nm and 640 nm respectively could be used together to label particles. A laser emitting light at 488 nm could be used as the confocal illumination source 810 and an LED emitting light between 625 nm and 645 nm could be used as the area illumination source 900. In an embodiment, a 50%/50% neutral density beam splitter could be used as the dichroic beam splitter 910. By imaging the sample using the confocal and area illumination sources separately but using the 650 nm-700 nm fluorescence detector 905 during acquisition of both images, an independent measure of the quantity of both of the fluorescent dyes bound to each particle could be made.

The area detectors 904 and 905 shown in FIG. 9 can be arrays of photodetectors (pixels) such as CCDs capable of imaging the entire field of view simultaneously. By taking multiple images of the sample at different points in time, such as before and after an image is generated using the confocal illumination source 810 and scan mirror 805, the system can determine whether or not any of the particles 801 has moved during the imaging process. This information can be used to reject measurements made on particles that moved enough to make the measurements inaccurate. As mentioned above, this can be part of the quality assurance achieved by the system of this disclosure.

Taking successive images with the area detectors 904 and 905 can be used to assist with auto-focusing the system. Prior to scanning the sample with the laser-scanning confocal optics, an image can be generated and analyzed using the area illumination 900 and area detectors 904 and 905 to ensure the sample is well-focused. Using an area detector such as a CMOS or CCD camera, an image can be obtained much faster than is possible by scanning the area with a laser. This method of imaging the sample enables much faster focusing. An area illumination source (such as an LED) can be chosen with a wavelength that is not absorbed by fluorescent dyes used in the assay to as great an extent as the wavelength of the confocal illumination source 810, which will typically be selected with a wavelength that is readily absorbed by the fluorescent materials used in the assay and stimulates relatively high fluorescent light emission from the particles in the sample 801. The particles in the sample 801 will experience less degradation (photobleaching) during the focusing process, resulting in a fluorescence measurement made by the confocal optical system with greater sensitivity.

Figure 10:
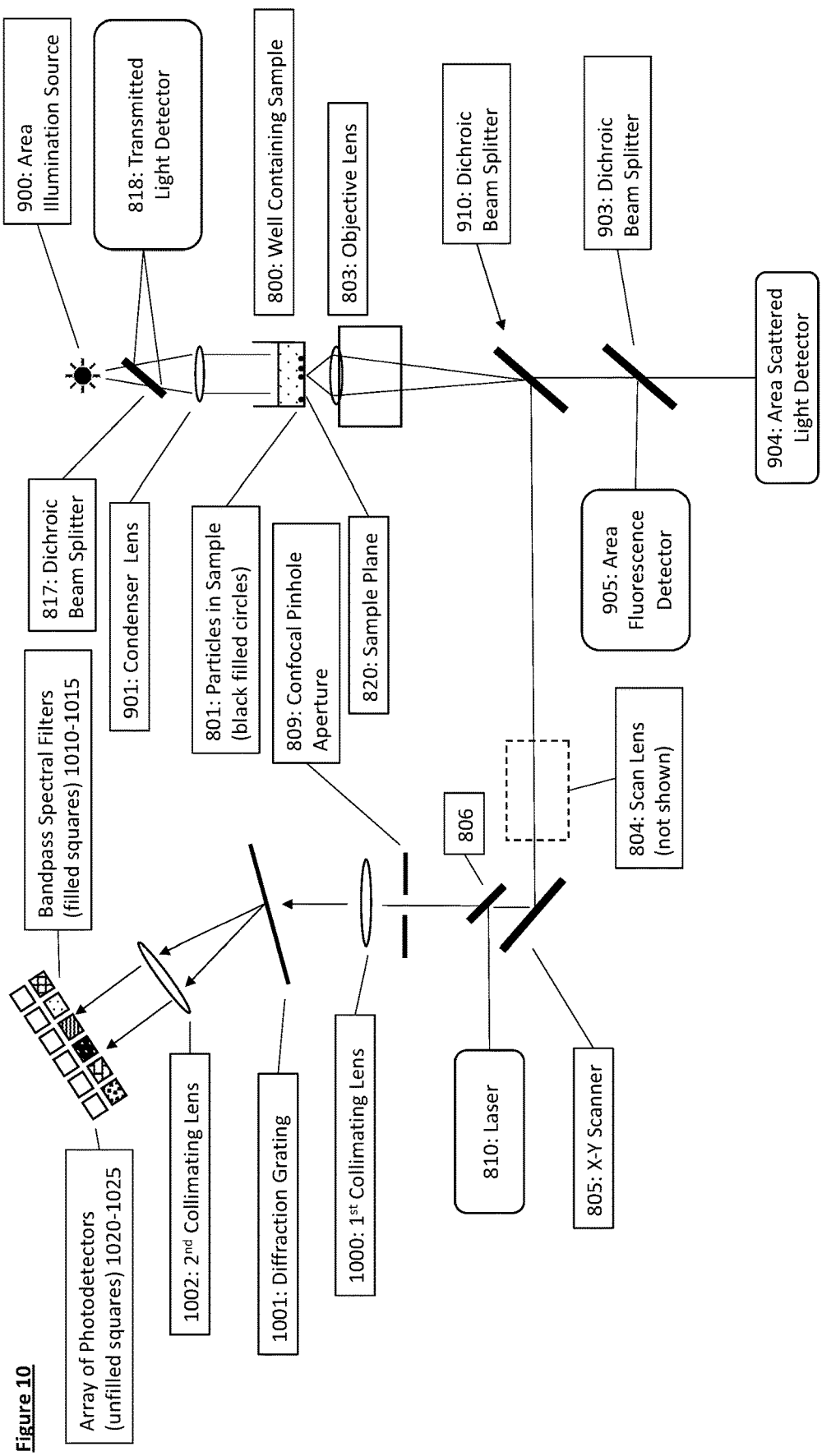
FIG. 10 shows the confocal apparatus of FIG. 9 combined with the spectral diffraction grating or prism, collimating lenses, multiple selected bandpass filters and array of photodetectors.

FIG. 10 illustrates the optical analysis system of FIG. 9 using the spectrometer enhanced with additional spectral filters disclosed herein and depicted in FIG. 5, and which uses an array of independent photodetectors to measure the signal for each fluorescence or scattered light channel.

A benefit of the apparatus illustrated in FIG. 10, in comparison to the apparatus shown in FIG. 9 and the configuration of many commercially available flow cytometers, is its simplicity when used to measure many different fluorescent channels. As previously stated, this apparatus eliminates multiple dichroic beam splitters each of which adds a source of expense, complexity, and possible misalignment.

A second benefit of the apparatus illustrated in FIG. 10 is the added light-filtering capability of the spectrometer disclosed here and illustrated in FIG. 5. Prior art, as well as commercially available flow cytometers, use either a combination of bandpass filters and dichroic beam splitters to divide the fluorescent signal or a spectrometer similar to the one illustrated in FIG. 4. None of these systems combines the dispersive element, discrete photodetectors with individually tunable gain, and bandpass filters optimized for each fluorescent channel that is disclosed here.

Figure 11:
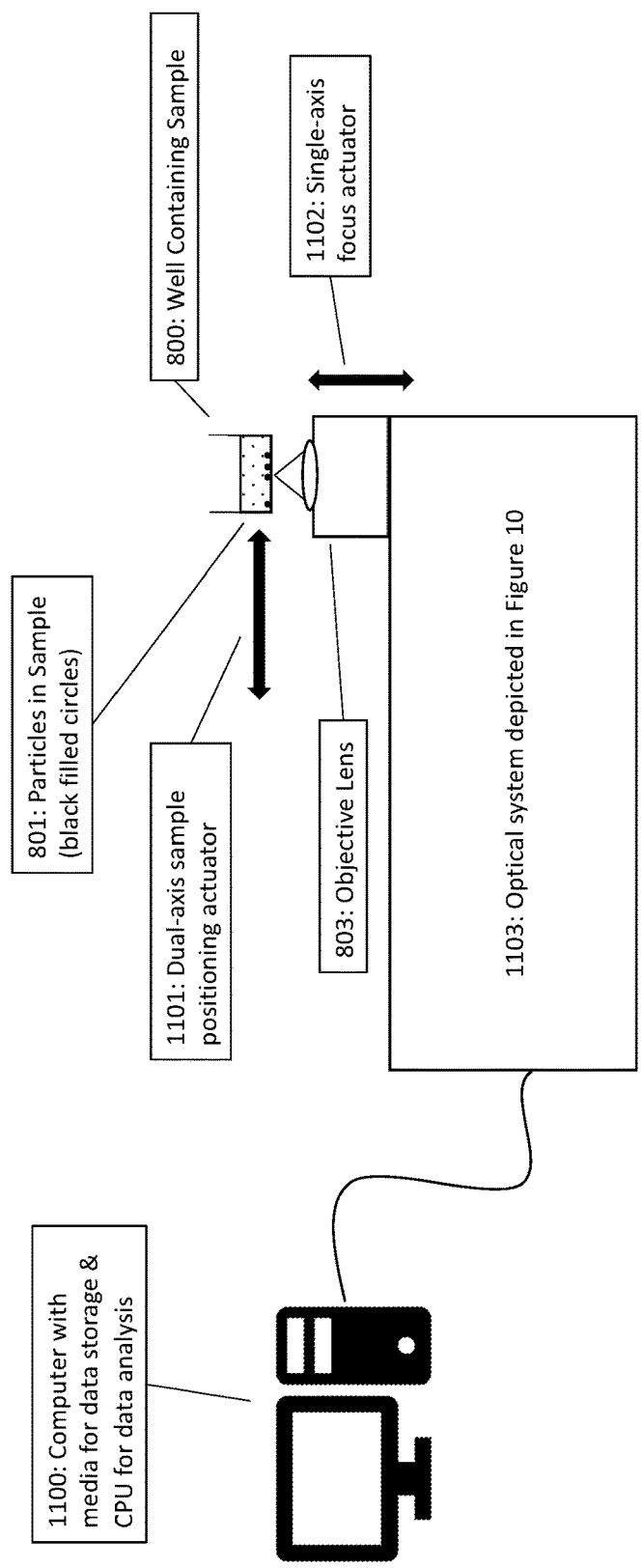
FIG. 11 shows the illumination and detection apparatus of FIG. 10 with a means of positioning the sample and focusing the sample and a computer with data storage media.

FIG. 11 depicts the optical analysis system 1103 in its various embodiments as described in this disclosure in combination with a computer (CPU) and memory storage 1100 capable of receiving, storing, and processing image data from the optical analysis system. It will be appreciated that one of the benefits of this apparatus and method is the ability to store raw image data obtained by scanning a sample for additional analysis that may take place at a later time than the initial analysis of the sample. Flow cytometers typically generate too large a volume of data for storage and subsequent analysis to be practical.

FIG. 11 illustrates a possible means of automating the analysis of samples, where a dual-axis actuator 1101 capable of positioning a sample relative to the optical analysis system enables automatic positioning and analysis of multiple samples that could be held in a multi-well container such as a microtiter plate. A single-axis actuator 1102 adjusts the position of the objective lens 803 relative to the sample 801 to enable automation of focusing the optical analysis system 1103 on each sample 801.

Other alternative possible embodiments include but are not limited to the following:

1. The confocal illumination could be provided by two or more sources.
2. The scanner could include a means of optically detecting the angular position of the mirror external to the scanning system that positions the mirror, such as reflecting a reference beam (not shown) onto a detector (not shown) such that the detector issues a pulse signal every time the reference beam crosses the detector.
3. The present invention could capture transmitted light with the transmitted light detector from one illumination source (as illustrated in FIG. 8, FIG. 9 and FIG. 10) or multiple illumination sources.
4. The present invention could capture fewer than two or more than two fluorescence signals, each corresponding to a unique region of the electromagnetic spectrum.
5. The present invention could include illumination sources that turn on and off rapidly and the fluorescence signal recorded by each detector could be sampled at sufficient speed to measure the decay of the fluorescence in between each pulse of illumination, so that multiple fluorescent dyes with overlapping excitation and/or emission spectra could be distinguished based on their fluorescent lifetime.
6. The scanner could scan in two dimensions, i.e., X-Y positions, by moving the sample in one dimension (e.g. translating the sample analysis chamber using a motorized stage) while scanning the illumination source (or sources) in the orthogonal direction, as opposed to using a scanner capable of optically scanning in two independent directions.
7. The system can generate two-dimensional images of the sample or can combine multiple two-dimensional images taken at different depths within the sample to develop a three-dimensional image of the sample.

People familiar with cytometry and microsphere-based immunoassays will appreciate the following benefits of the present invention:

1. The ability to measure samples within wells eliminates the need for fluid handling, which is costly, introduces cross-contamination between samples, increases the time required to process a sample, and is prone to failure.
2. Measuring samples within wells enables the system to make multiple measurements of each sample at different points in time, which could be used to increase the confidence of the measurement of each sample or to study time-varying properties of the samples.
3. The employment of a confocal optical system design allows efficient illumination of each particle while also minimizing illumination of areas not immediately being analyzed, which reduces interference of the sample analysis from stray light as well as interference of signal. Both the reduction of stray light and the brighter illumination of the sample enable more sensitive measurements of each particle.
4. The ability to capture and analyze particle data in real time allows the user to determine, either manually or automatically via a predetermined algorithm, when a sufficient number of particles has been analyzed to generate the desired data for a given sample.

5. The ability to record data as an image and re-analyze it at a later time is a useful feature where the results from a particular sample are unclear or questionable. Post-analysis may enable troubleshooting either of the assay or the instrument without requiring a visit from a trained technician.
6. The method of imaging the sample and the ability to auto-focus the optical system on each sample relaxes the tolerances required for the manufacture and assembly of the optical analysis system, relieving a significant burden associated with manufacturing, operating and maintaining traditional flow cytometers.
7. The ability to scan particles with illumination focused to a smaller size than the particle enables the study of characteristics of the particle such as surface texture or internal structure which cannot be measured in the same way using a conventional flow cytometer.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Although the disclosure has been explained in relation to its preferred embodiment, it is to be understood that many other possible modifications and variations can be made without departing from the spirit and scope of the disclosure and the scope of protection is only limited by the scope of the accompanying claims.

What I claim is:

1. A system for measuring fluorescence and light scattering of particles within a sample comprising:
    (a) a first light source wherein the light source is a continuous illuminating laser;
    (b) a substantially static sample comprising at least one particle within a liquid;
    (c) an objective lens which focuses light from the first light source onto a point within the sample and which collects a portion of the light emanating from the sample in response to the first continuous light source;
    (d) a light spectrum producing device comprising a diffractive element such as a diffraction grating or a dispersive element such as a prism, capable of separating light according to wavelength, wherein the light spectrum producing device is positioned distal to the objective lens and wherein the light spectrum producing device separates light emanating from the sample and collected by the objective lens, and wherein the light spectrum producing device directs the separated light towards a plurality of optical spectral bandpass filters and discrete photodetectors;
    (e) the plurality of spectral bandpass filters, each having varying and selected light transmission characteristics, positioned distal to the light spectrum producing device and each spectral bandpass filter having capacity to allow transmission of light at selected wavelengths and to block other light;
    (f) the plurality of discrete optical photodetectors each oriented to and having complementary sensitivity to the transmitted light through an associated individual spectral bandpass filter wherein a gain in a signal emitted from at least one of the photodetectors in response to a light received by the photodetector is adjustable independently of the other photodetectors; and
    (g) component to derive an image of the sample from light received from the plurality of discrete photodetectors.

2. The system of claim 1 wherein the light spectrum producing device is a diffraction grating.

3. The system of claim 2 further comprising an area illumination source wherein the area illumination source provides light at a different wavelength than the first light source.

4. The system of claim 1 wherein the light spectrum producing device is a prism.

5. The system of claim 1 comprising a confocal apparatus wherein the confocal apparatus includes an aperture or mask positioned on an image plane of the objective lens to isolate the plane of the sample and block stray and scattered light.

6. The system of claim 1 further comprising at least one gain adjustment component is specific to an individual photodetector.

7. A scanning cytometer for producing an image of a sample from which fluorescence of particles within the sample may be measured by illuminating at least a portion of a sample and by measuring fluorescence from the illuminated portion of the sample comprising:
    (a) a first continuous light source used to illuminate a substantially stationary sample comprising at least one particle in a liquid;
    (b) a scanner capable of scanning in two axes and the scanner is positioned between the first continuous light source and an objective lens to control a location within the sample onto which the first continuous light source is focused;
    (c) the objective lens which focuses the first light source onto a point within the sample and which collects a portion of the fluorescent and scattered light emanating from the sample in response to the first continuous light source;
    (d) a confocal aperture positioned distally from the objective lens and scanner and wherein the confocal aperture transmits light from the sample to a light spectrum producing device;
    (e) the light spectrum producing device such as a prism or diffraction grating which separates light emanating from the sample according to wavelength and wherein the light spectrum producing device is positioned distal to the confocal aperture and directs the separated light to a plurality of spectral bandpass filters;
    (f) the plurality of spectral bandpass filters having varying spectral filtering capacity wherein each spectral bandpass filter allows transmission of only a specified wavelength or range of wavelengths of light;
    (g) a plurality of photodetectors each aligned with an individual spectral bandpass filter to receive light transmitted through the aligned spectral bandpass filter and wherein a gain of a signal emitted by the photodetector in response to light received by the photodetector can be adjusted independently of the other photodetectors; and
    (h) component to derive an image from the emitted signal wherein the image can be used for measuring emitted fluorescence.

8. The scanning cytometer of claim 7 further comprising a non-scanning second light source comprising an area illumination source operating in combination with a fluorescent light detector.

9. The scanning cytometer of claim 8 wherein the fluorescent light detector is a CCD or CMOS camera.

10. The scanning cytometer of claim 7 wherein the position of the objective lens to the sample may be adjusted between successive scans wherein images from successive scans can be combined to create a 3D image.

11. The scanning cytometer of claim 7 further comprising a collimator lens.

12. The scanning cytometer of claim 7 further comprising a dichroic beamsplitter reflecting light of a first range of wavelength to a first detector and transmitting light of a second wavelength to a second detector.

13. The scanning cytometer of claim 7 further comprising an adjustable scan mirror wherein either the size of the area that is scanned and/or the speed with which the area is scanned may be altered.

14. The scanning cytometer of claim 7 wherein at least one photodetector is selected for sensitivity to a light spectrum transmitted through the aligned spectral bandpass filter.

15. The scanning cytometer of claim 7 further comprising:
 (a) a digital image capturing device;
 (b) a digital image storage device; and
 (c) a CPU for digital image analysis and image derivation.

16. The scanning cytometer of claim 15 further comprising a dual axis sample positioning actuator and a single axis objective lens focus actuator.

17. The scanning cytometer of claim 7 wherein each aligned photodetector has light sensitivity complementary to the capacity of the aligned spectral bandpass filter and the portion of the electromagnetic spectrum directed to that photodetector by the light spectrum producing device.

18. The scanning cytometer of claim 7 further comprising a collimator lens positioned distal to the light spectrum producing device.

19. The scanning cytometer of claim 7 further comprising measuring the quantity and wavelengths of light scattered by the illumination of at least a portion of a sample.

20. A system for measuring fluorescence of particles contained in a sample by imaging comprising scanning a continuous excitation light source upon a sample containing particles, utilization of a light spectrum producing device such as a prism or diffraction grating wherein the spectrum producing device separates said light according to wavelength and directs the differing spectrums of light received from the sample towards an array of spectral bandpass filters and discrete and individual photodetectors wherein the sensitivity of the system for measuring weak fluorescent light wavelengths is enhanced by the ability to individually optimize a quantity of signal emitted from the individual photodetector that results from the quantity of light received by the individual photodetector wherein this ability is augmented by the filtering capability of the individual bandpass filter matched with a discrete and independent photodetector and further including m on a component to derive an image of the detected measured fluorescence from which particle in the sample may be identified and measured.

* * * * *